(12) United States Patent
Wagner et al.

(10) Patent No.: US 9,373,111 B2
(45) Date of Patent: Jun. 21, 2016

(54) PAYMENT CARD WITH INTEGRATED CHIP

(75) Inventors: Kim Wagner, Sunnyvale, CA (US);
Dinah Sloan, San Jose, CA (US); Brian Byrne, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 472 days.

(21) Appl. No.: 13/570,185

(22) Filed: Aug. 8, 2012

(65) Prior Publication Data

US 2013/0041823 A1 Feb. 14, 2013

Related U.S. Application Data

(60) Provisional application No. 61/521,233, filed on Aug. 8, 2011.

(51) Int. Cl.
*G06Q 20/40* (2012.01)
*G06Q 20/32* (2012.01)
*G06Q 20/34* (2012.01)
*G06Q 20/38* (2012.01)

(52) U.S. Cl.
CPC ........... *G06Q 20/40* (2013.01); *G06Q 20/32* (2013.01); *G06Q 20/34* (2013.01); *G06Q 20/382* (2013.01)

(58) Field of Classification Search
None
See application file for complete search history.

(56) References Cited

U.S. PATENT DOCUMENTS

| | | | | |
|---|---|---|---|---|
| 5,590,197 A * | 12/1996 | Chen | ...... | G06Q 20/04 380/30 |
| 5,715,314 A | 2/1998 | Payne et al. | | |
| 5,855,008 A * | 12/1998 | Goldhaber | ...... | G06Q 30/02 705/14.1 |
| 5,892,900 A * | 4/1999 | Ginter | ...... | G06F 21/10 726/26 |
| 5,950,172 A | 9/1999 | Kingman | | |
| 6,658,568 B1 * | 12/2003 | Ginter | ...... | G06F 21/00 348/E5.006 |
| 6,675,153 B1 | 1/2004 | Cook et al. | | |
| 7,333,615 B1 * | 2/2008 | Jarboe | ...... | H04L 9/30 380/277 |
| 7,720,850 B2 | 5/2010 | Lu et al. | | |
| 7,809,650 B2 | 10/2010 | Bruesewitz et al. | | |
| 8,645,222 B1 | 2/2014 | Tamassia et al. | | |
| 2001/0037206 A1 | 11/2001 | Falk et al. | | |
| 2002/0131567 A1 * | 9/2002 | Maginas | ...... | G06Q 20/00 379/91.01 |
| 2004/0133480 A1 | 7/2004 | Domes | | |
| 2005/0035847 A1 * | 2/2005 | Bonalle | ...... | G06Q 20/00 340/5.61 |
| 2005/0080717 A1 | 4/2005 | Belyi et al. | | |
| 2006/0178986 A1 * | 8/2006 | Giordano | ...... | G06Q 20/04 705/40 |
| 2006/0261144 A1 * | 11/2006 | Foss | ...... | G06Q 10/0637 235/375 |
| 2007/0271234 A1 | 11/2007 | Ravikiran | | |

(Continued)

FOREIGN PATENT DOCUMENTS

WO 2007/033073 A2 3/2007
WO 2009/055719 A2 4/2009

(Continued)

OTHER PUBLICATIONS

International Search Report and Writen Opinion mailed Feb. 1, 2013 in PCT/US2012/050027, 10 pages.

(Continued)

*Primary Examiner* — Calvin L Hewitt, II
*Assistant Examiner* — Eduardo Castilho
(74) *Attorney, Agent, or Firm* — Kilpatrick Townsend & Stockton LLP

(57) ABSTRACT

A method is disclosed. It includes presenting a payment card to an access device, obtaining additional data, encrypting the additional data, and passing the encrypted additional data to the access device.

20 Claims, 7 Drawing Sheets

(56) References Cited

U.S. PATENT DOCUMENTS

| | | | |
|---|---|---|---|
| 2008/0179393 A1 | 7/2008 | Antoo | |
| 2008/0319869 A1 | 12/2008 | Carlson et al. | |
| 2009/0259499 A1 | 10/2009 | Bhojwani et al. | |
| 2010/0030644 A1 | 2/2010 | Dhamodharan | |
| 2010/0146283 A1 | 6/2010 | Poitier et al. | |
| 2010/0185546 A1* | 7/2010 | Pollard | G06Q 10/0637 705/80 |
| 2010/0248706 A1 | 9/2010 | Potkonjak et al. | |
| 2010/0299267 A1 | 11/2010 | Faith et al. | |
| 2011/0098023 A1 | 4/2011 | Hammad | |
| 2011/0106659 A1 | 5/2011 | Faith et al. | |
| 2011/0137804 A1* | 6/2011 | Peterson | G06Q 20/085 705/77 |
| 2011/0264587 A1* | 10/2011 | Bykov | G06Q 20/02 705/76 |

FOREIGN PATENT DOCUMENTS

| | | | |
|---|---|---|---|
| WO | 2010/033967 A1 | 3/2010 | |
| WO | 2010/056951 A2 | 5/2010 | |
| WO | 2010-138445 A2 | 12/2010 | |

OTHER PUBLICATIONS

International Search Report and Written Opinion mailed Feb. 28, 2013 in PCT/US2012/050020, 12 pages.

Horne, Bill, et al., "Dynamic Self-Checking Techniques for Improved Tamper Resistance," DRM 2001, LNCS 2320, pp. 141-159.

Pavlovic, Dusko, "Quantifying and Qualifying Trust: Spectral Decomposition of Trust Networks," Dec. 19, 2010, Universities of Oxford and Twente, 18 pages.

Sathiaseelan, JGR, et al., "MLSF: A Framework for Multi-Level Secure Composite Web Services," Advances in Information Sciences and Services Sciences, Dec. 2010, vol. 2, No. 4, pp. 71-78.

Choi, Y.B., et al., "The state-of-the-art of mobile payment architecture and emerging issues," Int. J. Electronic Finance, 2006, vol. 1, No., 1, pp. 94-103.

Chen, Lei-da, "A model of consumer acceptance of mobile payment," Int. J. Mobile Communications, 2008, vol. 6, No. 1, pp. 32-52.

Chong, S.K., "Feedback credibility issues in trust management systems," 2007 International Conference on Multimedia and Ubiquitous Engineering (MUE'07), 5 pages.

Rankl, W., et al., "Smart Card Handbook 2010," http://books.google.com/books.

International Preliminary Report on Patentability mailed Feb. 20, 2014 in PCT/US2012/050027, 7 pages.

International Preliminary Report on Patentability mailed Feb. 20, 2014 in PCT/US2012/050020, 9 pages.

Non-Final Office Action mailed Nov. 28, 2014 in U.S. Appl. No. 13/570,178, 20 pages.

Extended European Search Report mailed Dec. 5, 2014 in EP Patent Application No. 12821882.3, 6 pages.

* cited by examiner

PAYMENT CARD WITH INTEGRATED CHIP

CROSS REFERENCE TO RELATED APPLICATIONS

This application is a non-provisional of and claims the benefit of the filing date of U.S. Provisional Patent Application No. 61/521,233, filed on Aug. 8, 2011, which is herein incorporated by reference in its entirety for all purposes.

BACKGROUND

For businesses and merchants to improve their goods and services provided to consumers, merchants may gather additional data, such as sensitive or personal data (e.g. geographical location, profile information of the user, transaction history, or any other data from the user etc.) relating to the consumer as well as feedback data about the consumer's experience at a merchant, and analyze the data for future use. Consumers may be asked to fill out surveys or answer questions at a later time, and may be provided incentives for filling out a survey to provide additional feedback. However, such methods risk the additional data falling in to the wrong hands and being used for fraudulent or otherwise undesirable purposes. In addition, the filling out of surveys is often too time consuming and troublesome for consumers.

Furthermore, when a consumer provides additional data of their experience at the merchant at a later time, the consumer may have forgotten relevant details of the experience. Also, the merchant may not be able to identify a transaction associated with the experience of the consumer, making it difficult for the merchant to target areas of improvement.

Also, since the additional data is collected by the merchant or the merchant's employee in some cases, the merchant or its employee has access to the additional data. There may be some potential for the merchant or its employee to distribute the additional data and/or to tamper with and falsify the additional data.

Embodiments of the invention address these and other problems, individually and collectively.

BRIEF SUMMARY

Embodiments of the invention relate to payment applications, systems, and methods.

One embodiment of the invention is directed to a method comprising: receiving additional data from a payment card used to conduct a transaction, wherein the additional data is encrypted and is associated with the transaction; generating, by an access device, an authorization request message comprising the encrypted additional data; transmitting the authorization request message comprising the encrypted additional data to a server computer; and receiving an authorization response message from the server computer. Other embodiments are directed to access devices that can perform the method.

Another embodiment of the invention is directed to a method comprising receiving an authorization request message comprising encrypted additional data from a payment card for a transaction from an access device operated by a merchant; decrypting, by a server computer, the encrypted additional data associated with the transaction; storing the decrypted additional data associated with the transaction in a database; determining whether the merchant is eligible to receive decrypted additional data; and transmitting an authorization response message to the access device. Other embodiments of the invention are directed to server computers that can perform the method.

These and other embodiments are described in further detail below.

DETAILED DESCRIPTION

Figure 1:
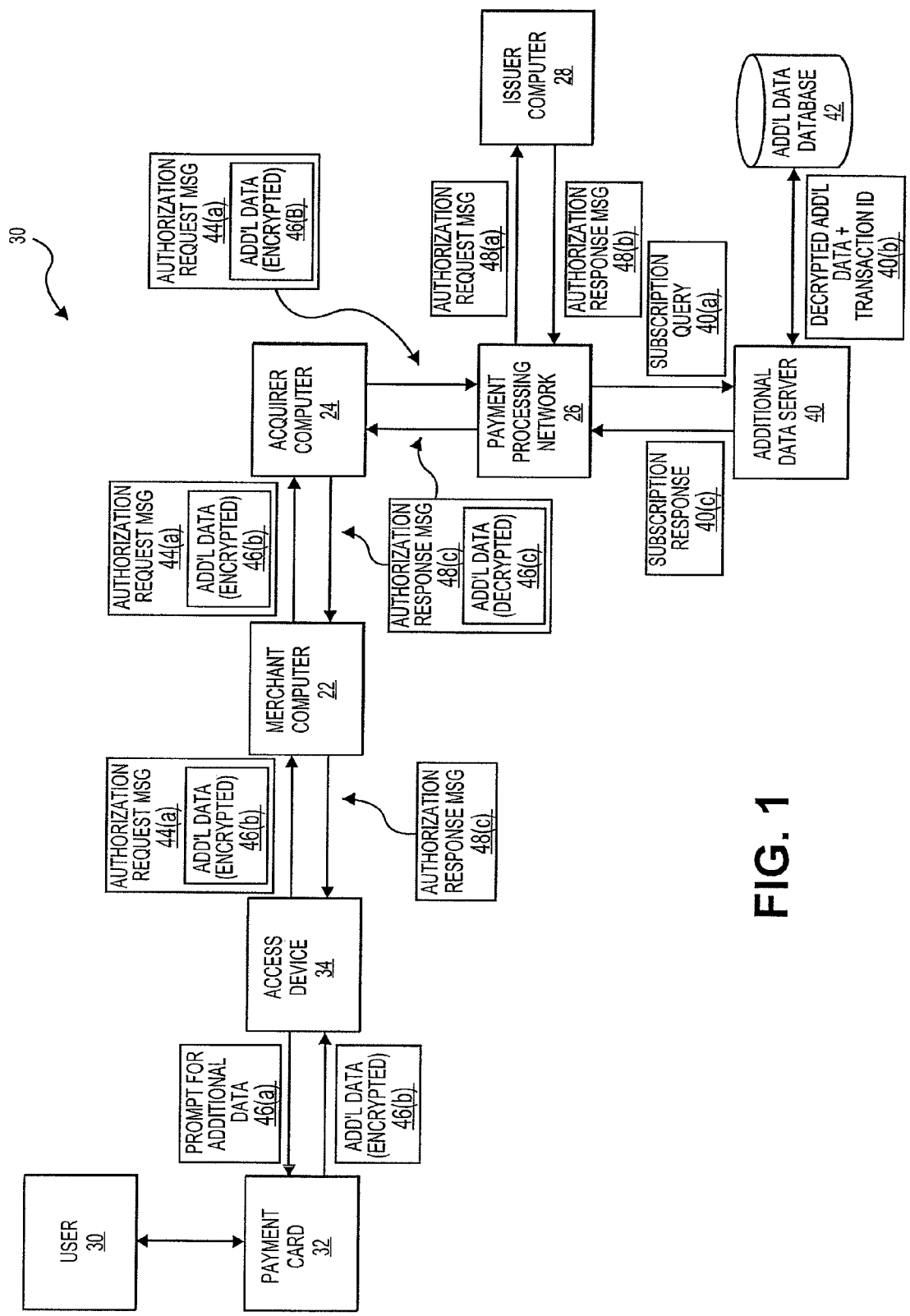
FIG. 1 shows a block diagram of a system according to an embodiment of the invention.

Many merchants or businesses providing products or services may like to collate customer information and receive customer feedback to improve products or services to increase business and revenue. Currently there are means for users to review and rate businesses and merchants, for example, through websites to share their experiences with other users. These review forums allow users to research merchants and businesses to help them determine which merchants to patronize based on other users' reviews and ratings. However, these forums may not be as beneficial for merchants, because it is difficult for the merchant to associate a specific review with a specific transaction and/or user. Thus, the merchant may not be able to find an effective strategy to improve their business because they cannot target areas of improvement if they cannot associate a specific negative review or rating with a specific transaction. Additionally, since anyone can sign up for a review account on existing review websites, a merchant may create false reviews to alter their rating, affecting users' trust in using rating services and motivation to rate merchants. Embodiments of the invention address this and other problems.

Embodiments of the invention provide a system and method where additional data (e.g., information relating to a user, user feedback, ratings of the merchant by the user, etc.) may be associated with a specific transaction may be received at the time of the transaction, encrypted, transmitted by a portable consumer device such as a mobile phone or a payment card, to an access device, such as a point-of-sale terminal (POS terminal). The encrypted additional data can be transmitted to a server computer operated by a payment processing network (e.g., VisaNet) or entity other than the merchant. The server computer in the payment processing network may decrypt the encrypted additional data, and store the additional data in a database. At some point in time, the server computer can re-transmit the decrypted additional data to the merchant.

Since the additional data is encrypted before being transmitted to the access device (e.g., POS terminal) and is only decrypted at the payment processing network (or entity other than the merchant), illegal distribution, merchant tampering and/or falsifying of the additional data can be prevented. For example, using embodiments of the invention, the merchant cannot falsify ratings data (e.g., change an unfavorable review into a favorable one) in an attempt to generate additional business. Additionally, since the additional data is collected at the same time a specific transaction is being conducted, the additional data (e.g., feedback, profile information of the user, etc.) can be directly associated with the specific transaction. This can tie a specific transaction to the additional data, thereby providing the merchant or other party with better analytics. For example, a specific review may be tied to a specific purchase, and a specific payment account number. If, for example, negative reviews are all provided by consumers within a specific time window associated with those purchases, this may indicate that poor customer service may have been provided during this time.

In embodiments of the invention, payment transactions may be conducted using a portable consumer device that is used by a user. The portable consumer device may be a payment card with an integrated chip (e.g., smartcard).

Also in embodiments of the invention, the portable consumer device may interact with an access device. The access device may be a mobile POS terminal that the merchant may present to the user at the time of the transaction. As will be described below, the user may enter the additional data into the access device and the access device may generate and transmit an authorization request message comprising the encrypted additional data to a payment processing network.

Embodiments of the invention using a mobile payment application on a portable consumer device, such as a card, may include an integrated chip used for cryptographic operations for payment security purposes. This integrated chip may be used in payment applications to conduct transactions to secure payment, as well as to collect, encrypt, store, and retransmit to a payment processing network (or entity other than the merchant) additional data associated with the transaction.

Embodiments of the invention further allow the payment processing network or other entity to bundle the decrypted additional data associated with specific transactions for the merchant. The merchant may subscribe to services from the payment processing network or other entity to receive decrypted additional data associated with the transactions and/or corresponding users. By requiring the merchants to subscribe in order to access the additional data, the security of the system is increased. The transaction-specific additional data may be used by the merchant for marketing or business research purposes. The additional data may be user profile information or feedback, such as a rating, which is associated with a specific transaction. Since the feedback is associated with a specific transaction, the merchant can easily determine what users do and do not like and target specific areas of improvement in their business to increase revenue.

Embodiments of the invention provide the payment processing network with additional data related to a transaction conducted by a portable consumer device. As noted above, the additional data may be desirable for merchants to acquire. The payment processing network may sell this additional data to the merchants associated to the transactions. Additional data associated with the transaction may include data such as feedback, ratings, geographical location, profile information of the user, transaction history, or any other data from the user at the time of the transaction that the merchant may not otherwise be able to obtain. Other examples of additional data may include surveys. For example, in embodiments of the invention, the consumer may be prompted to answer a survey to provide preferences on what type of food, shopping, cars, music, etc., the consumer likes. Thus, in some embodiments, the additional data need not relate to the specific merchant at which the current transaction is conducted. The additional data may also have value to entities (e.g., marketers) other than the merchant.

Prior to discussing various embodiments in greater detail, several terms will be described to provide a better understanding of this disclosure.

As used herein, a "portable consumer device" may include any suitable device that may be used to conduct a financial transaction. A portable consumer device may be in any suitable form. For example, suitable portable consumer devices can be hand-held and compact so that they can fit into a consumer's wallet and/or pocket (e.g., pocket-sized). They may include smart cards, keychain devices (such as the Speedpass™ commercially available from Exxon-Mobil Corp.), etc. Other examples of portable consumer devices include payment cards, security cards, access cards, smart media, transponders, etc. If the portable consumer device is in the form of a debit, credit, or smartcard, the portable consumer device may also optionally have features such as magnetic stripes. Such portable consumer devices can operate in either a contact or contactless mode.

A "payment card" as used herein may include a card with an integrated chip. It may be capable of communicating with an access device. The payment card may comprise payment data, such as an account identifier, security code, card verification value, dynamic card verification value, and expiration date. Additional information that may be stored on the payment card may include personal data identifying an authorized user of the payment card, such as a photo, or other identifying information. The payment card can also be a debit device (e.g., a debit card), credit device (e.g., a credit card), or stored value device (e.g., a stored value card). They may include smart cards, credit or debit cards (with a magnetic stripe), keychain devices (such as the Speedpass™ commercially available from Exxon-Mobil Corp.), etc.

As used herein, an "access device" may be any suitable device for communicating with a merchant computer or payment processing network, and for interacting with a payment card. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with a payment card. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment card.

As used herein, "transaction data" may include data relating to a transaction. In some embodiments, transaction data may include data as contained in an authorization request message, contained in an authorization response message, and/or generated by the processing of an authorization message. For example, transaction data can include a unique transaction identifier, transaction date and time, account number, transaction class code (e.g., credit, debit, ATM, prepaid, etc.), merchant code (e.g., MW, DBA, etc.), ATM code, acquirer code, acquirer processor code, issuer code (e.g., BIN, etc.), issuer processor code, authorization category code (e.g., approved, declined, rejected, etc.), one or more error codes, transaction amount (e.g., settlement amount), cardholder or account holder information (e.g., name, date of birth, address, phone number, etc.), card verification value (CVV), expiration date, loyalty account information, and other information relating to the transaction.

"Additional data" can include data that is not typically included in conducting a transaction, and is not typically transmitted with the transaction data in an authorization request message. Examples of additional data may include, feedback, ratings, geographical location, personal information of the user (e.g., image), shopping profile of the user, authentication message of the user (e.g., cardholder), device ID, or other data associated with the transaction and/or user. Additional data may be collected from the user at a time of a transaction, and may be encrypted. Also, in some embodiments, additional data is specifically created and entered by the user at the time of the transaction.

To prevent tampering or falsifying of the additional data, the additional data may be encrypted. Encryption allows merchants, issuers, acquirers, and other entities to verify the identity of the source of the information (e.g., the additional data is from a valid user), without allowing other parties, such as the merchant, to tamper with the data.

An "authorization request message" may include an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc.

An "authorization response message" may be an electronic message reply to an authorization request message. The authorization response message may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "payment processing network" may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transaction, and other types of commercial transactions. VisaNet™, in particular, includes a VIP system (Visa Integrated Payments system) which processes authorization requests and a Base II system which performs clearing and settlement services.

As used herein, an "acquirer computer" may be an entity that processes electronic payment transactions on behalf of an acquirer, or that cooperates with an acquirer to process electronic payment transactions.

As used herein, an "issuer computer" may be an entity that processes electronic payment transactions on behalf of an issuer, or that cooperates with an issuer to process electronic payment transactions. An issuer processor may include data processing subsystems, networks, and operations used to support and deliver various services such as network gateway, risk management, program management, authorization, exception file, and clearing and settlement services.

As used herein, a "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to one or more databases and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Figure 2:
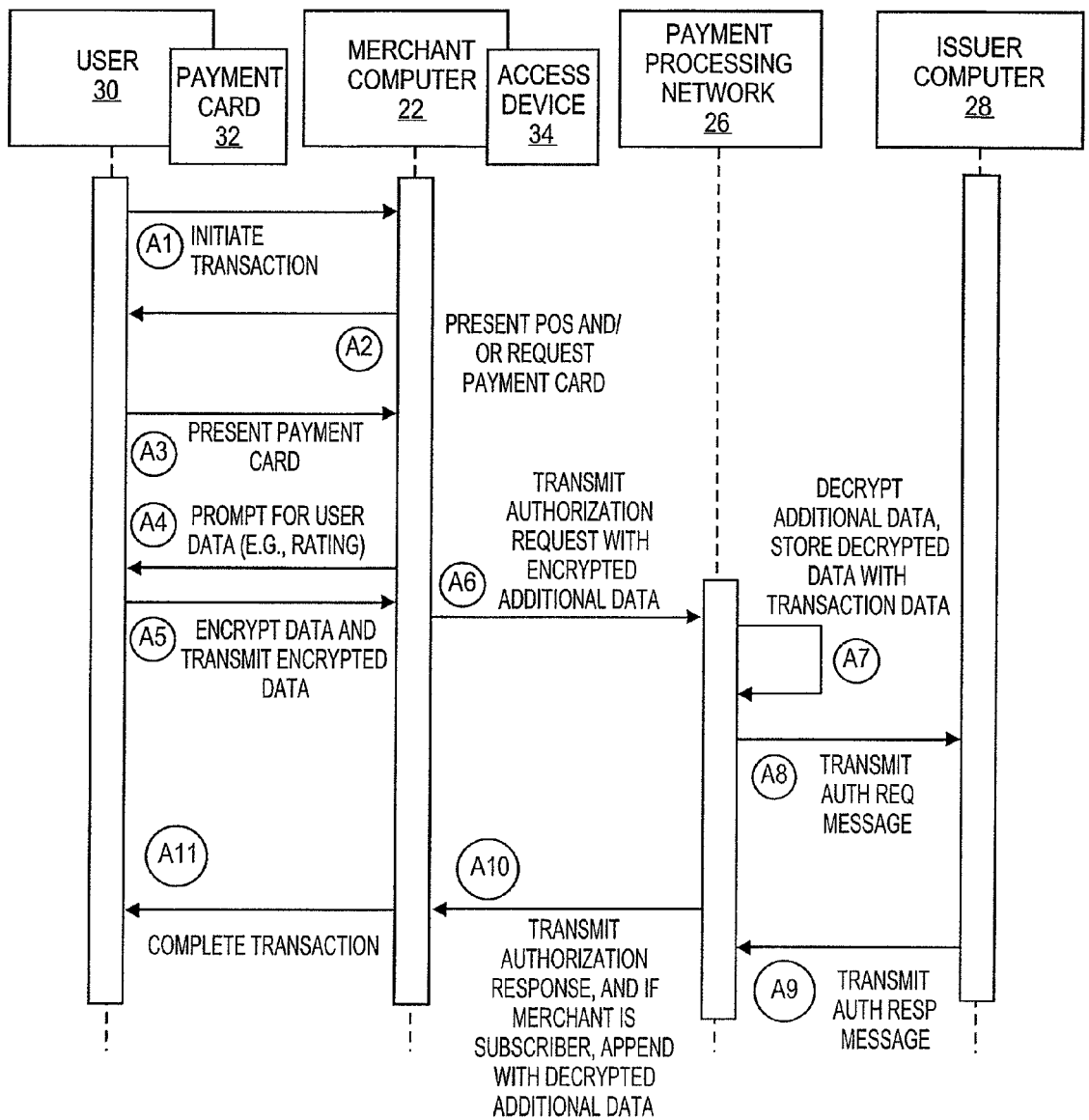
FIG. 2 shows a flowchart illustrating a method of conducting a transaction according to an embodiment of the invention.

FIG. 2 shows a block diagram illustrating a system for conducting a transaction according to an embodiment of the invention. System 30 comprises a user 30 with a payment card 32. An access device 34, a merchant computer 22, an acquirer computer 24, a payment processing network (e.g., VisaNet) 26, and an issuer computer 28 may all be operatively coupled together. The system 10 may also comprise an additional data server 40 and an additional data database 42. Further details about each of these components are provided below.

In an embodiment of the invention, the user 30 may wish to conduct a transaction. At some point during the transaction, the access device 34 may provide a prompt to the user 30 for additional data associated with the transaction. The prompt for the additional information 46(a) may be displayed on the access device 34. The user 30 may then enter the additional information into the access device 34. For example, the user 30 may provide additional information such as authentication data (e.g., a password) to the access device 34. It might be useful to encrypt additional information such as a password, so that the merchant is unable to obtain the password. This increases the level of security in case the merchant or the merchant's employee is deemed untrustworthy.

In other embodiments, the prompt could come from the payment card 32 to be displayed on the access device 34. The access device 34 then sends the collected additional data to the payment card 32 so that it can be encrypted.

Once received, the payment card 32 may encrypt the additional information and can transmit the encrypted additional data 46(b) to the access device 34. The payment card 34 may communicate with the access device 34 in either a wired or wireless (e.g., contactless) mode.

In other embodiments of the invention, the prompt for the additional information 46(a) may be any suitable prompt for additional data that is typically not included in a conventional payment transaction. Other examples of additional data include user feedback, geographical location, authentication messages, etc.

After it receives the encrypted additional data, the access device 34 generates an authorization request message 34(*a*) including the encrypted additional data 46(*b*). The authorization request message 44(*a*) with the encrypted additional information 46(*b*) is then transmitted from the access device 34 to a merchant computer 22, which transmits it to an acquirer computer 24, and to a server computer in the payment processing network 26.

The server computer in the payment processing network (e.g., VisaNet) 26 may remove the encrypted additional information 46(*b*) from the authorization request message 44(*a*), and may decrypt the encrypted additional data. The payment processing network 26 may then generate a second authorization request message 48(*a*) without the encrypted additional data 46(*b*). The second authorization request message 48(*a*) comprises typical transaction data for authorization, which is then transmitted to the issuer computer 28. The issuer computer 28 then determines whether or not to approve or decline the transaction.

In response, the issuer computer 28 generates an authorization response message 48(*b*), approving or declining the transaction, and transmits the authorization response message 48(*b*) to the payment processing network 26.

The payment processing network 26, after removing the encrypted additional data 34(*a*) from the authorization request message 44(*a*) and decrypting it, may determine whether or not the merchant has requested the additional information. The merchant may have subscribed to a subscription service to receive the additional data associated with the transactions.

In some embodiments, the payment processing network 26 may generate and transmit a subscription query 40(*c*) to an additional data server computer 40 or other entity, coupled to an additional data database 42. If the additional data server computer 40 determines that the merchant is subscribed, and is therefore eligible to receive the decrypted additional data, the decrypted additional data and an associated transaction ID 40(*b*) are stored in the additional data database 42. Other transaction data may be stored and associated with the decrypted additional data including an account identifier, merchant ID, transaction details (e.g., products purchased or services received), and transaction amount. The additional data server computer 40 may generate and transmit a subscription response 40(*c*) to the payment processing network 26 to confirm whether the merchant is subscribed or not.

Although the additional data server computer 40 and the additional data database 42 are shown as being outside of the payment processing network 26, they may be present in the payment processing network 26 in other embodiments of the invention.

When the server computer in the payment processing network 26 receives the subscription response 40(*c*) with confirmation that the merchant is subscribed and is therefore eligible to receive the decrypted additional data (e.g., decrypted ratings), the payment processing network 26 incorporates the decrypted additional data 46(*c*) with the authorization response message 48(*b*) from the issuer computer 28 to generate a modified authorization response message 48(*c*). In other embodiments, other entities including a payment processing network may generate an authorization response message on behalf of an issuer. The authorization response message 48(*b*) comprises the decrypted additional data 46(*c*) and is transmitted through the acquirer computer 24, and to the merchant computer 22. The merchant computer 22 can remove the decrypted additional data 36(*c*) from the authorization response message 48(*c*), and store it in a local database (not shown) for future analysis. It can also forward the authorization response message 48(*c*) to the access device 34.

In some embodiments of the invention, the decrypted rating may be transmitted directly to the merchant computer 22 from the payment processing network 26, and may be transmitted separately from the authorization response message.

Figure 3:
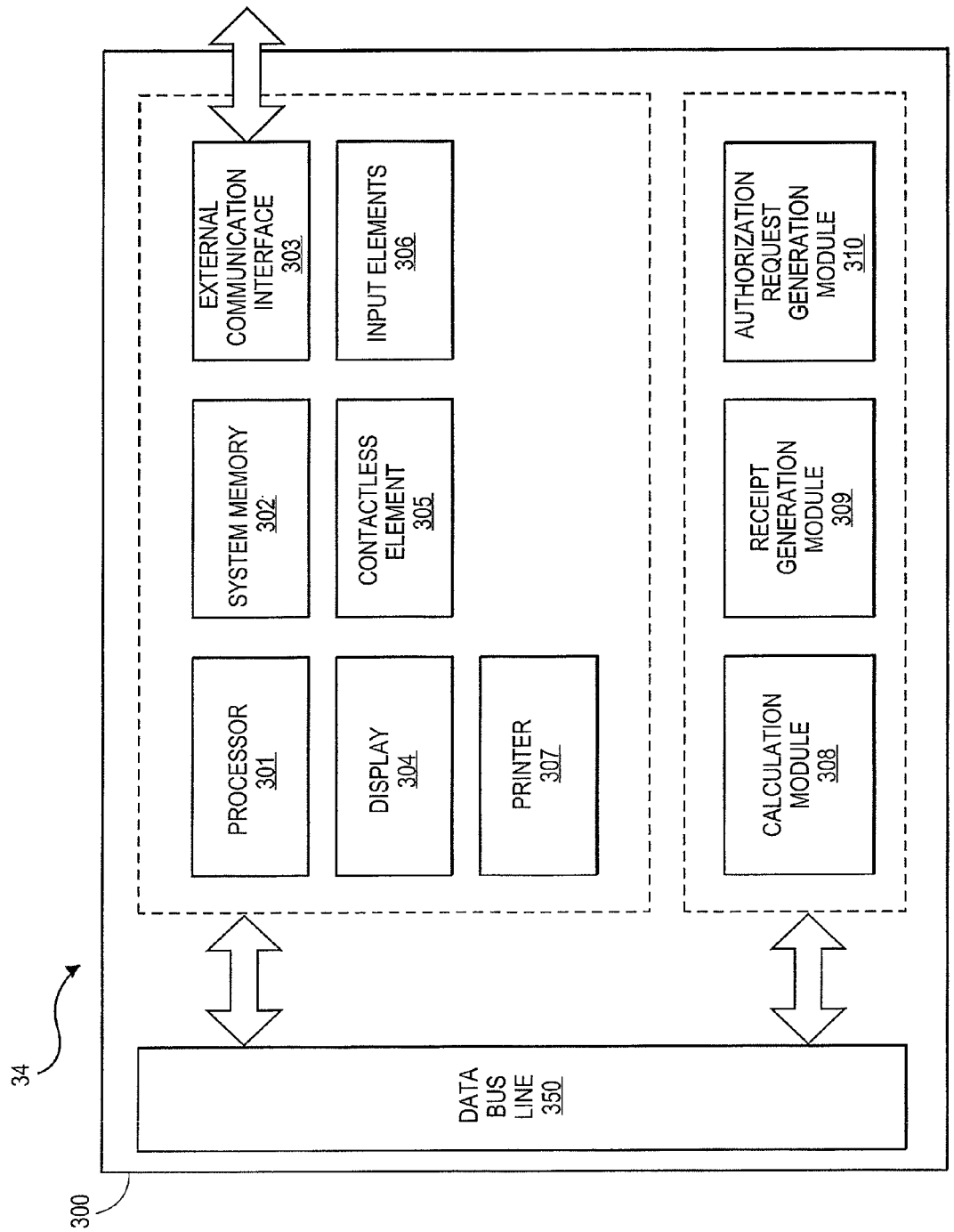
FIG. 3 shows a block diagram of an exemplary access device according to embodiments of the invention.

FIG. 3 shows a flowchart illustrating a method of conducting a transaction according to the embodiment of the invention described above corresponding to FIG. 2. A user 30 may possess a payment card 32 to conduct the transaction with a merchant at an access device 34.

In step A1, the user 30 initiates a payment transaction with the merchant at the access device 34. For example, the user 30 may have just finished a meal at a restaurant and is ready to pay for the meal, thus asking a waiter for a bill.

In step A2, the user 30 may be presented with the bill, and an access device 34, such as a mobile merchant POS terminal, in which a payment card 32 is requested.

In step A3, the user 30 presents the payment card 32 for payment. In some embodiments the payment card 32 may communicate with the access device 34 by tapping or touching payment card 32 on the access device 34, or inserting the payment card 32 into the access device. Where the payment card 32 is a contactless payment card with an integrated chip, B3 may include holding the payment card 32 with integrated chip in proximity of the access device so that they can communicate with each other wirelessly or through other contactless means.

In step A4, the user 30 may be prompted for additional data, such as geographical location, preferences, user image, shopping profile, or other additional data associated with the transaction. The additional data may also include additional payment information, personal user information, etc., or other additional data associated with the transaction. In some embodiments, the additional data may be obtained directly from the payment card 32 without a prompt to the user (e.g., geo-location data may be generated by a payment card, encrypted and sent to the access device). In some embodiments, the user 30 may receive a prompt on the access device 34 to enter the additional data and then interact the payment device 32 with the access device 34, such that the user's payment card 32, when in contact with the access device 34, may communicate with the access device 34 to receive the additional data from the access device 34. The payment card 32 may communicate with the access device 34 by contactless means (e.g., wireless communication).

In step A5, the additional data entered by user 30 on the access device 34 and received by the payment card 32 is encrypted by the payment card 32 and the encrypted additional data is transmitted to the access device 34. The user's payment card 32 encrypts and transmits the encrypted additional data to the access device 34. No data from the user 30 or the user's payment card 32 is stored at the access device 34.

In step A4, the access device 34 transmits the additional data to the payment card 32. In step B5, the access device 34 receives the encrypted data from the payment card 32. These steps can coincide with a standard request for a cryptogram from the payment card 32, and the subsequent transmission of the cryptogram from the card 32 to the access device 34. In the cryptogram request, terminal data (e.g., a terminal unpredictable number and a transaction amount) may be transmitted from the access device 34 to the payment card 32. A processor in the payment card 32 may then generate a cryptogram using an application transaction counter on the payment card and the terminal data. This cryptogram is then transmitted from the payment card to the access device 32. By incorporating the transmission of the additional data to the card with the cryptogram request, and by incorporating the transmission of the encrypted additional data with the transmission of the cryptogram, the additional data encryption process can be efficiently incorporated into an pre-existing communication process without requiring the creation of additional communication processes.

Further details regarding known interaction protocols between a payment card and an access device (e.g., a payment terminal) can be found in U.S. patent application Ser. No. 11/536,307, filed on Sep. 28, 2006, which is herein incorporated by reference in its entirety.

In step A6, the access device 34 receives the encrypted additional data from the payment card 32 of the user, and generates an authorization request message to transmit to the payment processing network 26. The authorization request message may include transaction data typically contained in an authorization request message. Transaction data may include payment information (e.g., payment card identifier, card verification value, etc.) In embodiments of the invention, the encrypted additional data is bundled and included with the transaction data in the authorization request message transmission.

In step A7, the payment processing network (e.g., VisaNet) 26 receives the authorization request message with the encrypted additional data. The payment processing network 26 initiates authorization of the transaction using transaction data from the authorization request message. Additionally, the encrypted additional data is removed from the authorization request message and decrypted, associated with the specific transaction using a transaction ID, and stored in a database with the associated transaction. The payment processing network 26 also determines if the merchant is subscribed to receive decrypted additional data from the payment processing network 26. In other variations of the invention, the payment processing network 26 may communicate with another entity comprising a server computer (e.g., additional data server 40 of FIG. 1) and a database (e.g., additional data database 42 of FIG. 3) to determine whether the merchant is subscribed and therefore eligible to receive decrypted additional data associated with the transaction.

In step B8, after receiving the authorization request message including the encrypted additional data, the payment processing network 26 (e.g., VisaNet) removes the encrypted additional data, and generates an authorization request message without the encrypted additional data. The authorization request message is transmitted to an issuer computer 28. The issuer computer 28 determined whether to authorize the transaction, and generates an authorization response message indicating whether the transaction is approved or declined.

In step B9, the issuer computer 28 transmits the authorization response message to the payment processing network 26, in which the authorization response message contains an indication of whether the transaction is approved or declined. In other embodiments, the payment processing network 26 may generate and transmit the authorization response message on behalf of the issuer.

In step A10, the payment processing network 26 generates an authorization response message to be transmitted to the merchant computer 22. If in step B7 it has been determined that the merchant is a subscriber, the payment processing network 26 will bundle the decrypted additional data with the authorization response message. The payment processing network 26 will then transmit the authorization response message with the decrypted additional data to the merchant computer 22. If the merchant is not a subscriber, then the payment processing network 26 will generate and transmit the authorization response message to the merchant computer 22 without the decrypted additional data.

The decrypted additional data is removed from the authorization response message and stored at the merchant computer for the merchant to analyze and use. An authorization response message without the decrypted additional data is then forwarded to the access device 34 to be displayed to the user 30 that the transaction is complete in step A11. In some embodiments, the authorization response message may pass from the access device 34, back to the payment card.

With reference to FIG. 3, an exemplary access device 34 is shown. The exemplary access device 34 is illustrated as comprising a plurality of hardware elements and software modules (301-310). However, it should be appreciated that this is provided for illustration purposes only, and each of the modules and associated functionality may be provided and/or performed by the same or different components.

The access device 34 comprises a processor 301, system memory 302 (which may comprise any combination of volatile and/or non-volatile memory such as, for example, buffer memory, RAM, DRAM, ROM, flash, or any other suitable memory device), and an external communication interface 303. It may also include a display 304, a contactless element 305, input elements 306, and a printer 307, all operatively coupled to a processor 301. In other embodiments, the access device 34 may also have a contact element (not shown) for contact based transactions, where the access device 34 contacts a portable consumer device.

The access device 34 may comprise software modules, such as a calculation module 308, using the transaction data to calculate transaction amounts, such as a subtotal, tax, discount, and total amount for the transaction. This transactional data may also be used to generate a receipt, performed by the receipt generation module 309. Further, a printer 307 may print the receipt or other relevant transactional data, such as a coupon.

The access device 34 may also comprise a contactless element 305 to communicate with suitable portable consumer devices. The access device 34 may receive information via input elements 306, such as a keypad, from a user. Any received information may be transmitted to an appropriate module within the computer 300 (e.g. via a data bus line 350).

The access device 34 may also receive additional data from a payment card, communicating through the contactless element 305. The received information, transaction information, and additional data may be used to generate an authorization request message in an appropriate data format in conformance with a transmission protocol so that the message may be sent to an issuer or payment processing network. The authorization request message may be generated by the authorization request generation software module 310, and may then be passed to the external communication interface 303 for transmission. Thus, the access device 34 is capable of generating an authorization request message, and in some embodiments, the authorization request message comprises encrypted additional data. The access device 34 may then transmit the authorization request message to a server computer operated by a payment processing network, acquirer, and/or issuer. The external communication interface 303 may receive authorization response messages, or transmit an authorization request message to an issuer, acquirer, or payment processing network. Thus, the access device may also receive an authorization response message from the server computer operated by the payment processing network, issuer, and/or acquirer.

Figure 4:
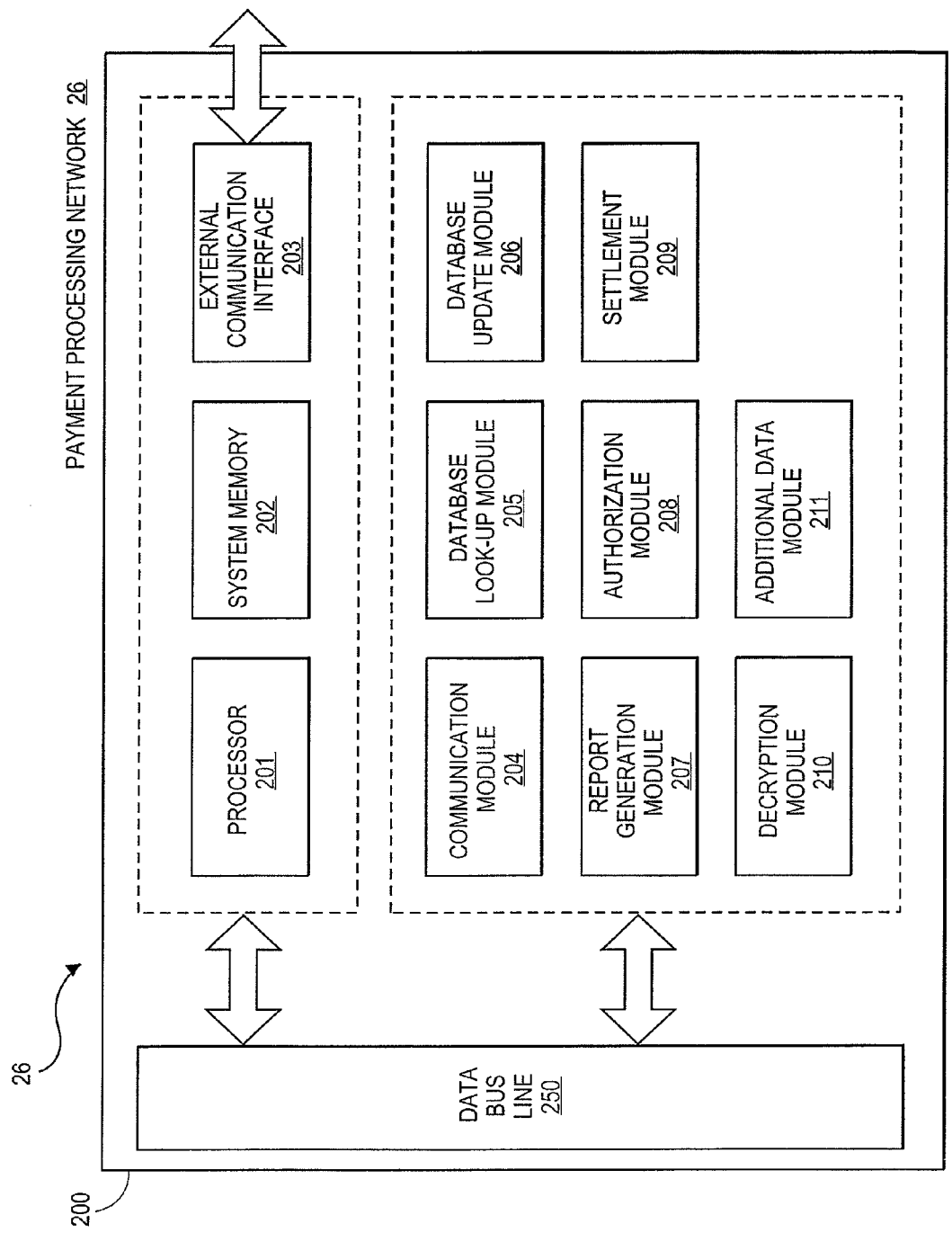
FIG. 4 shows a block diagram of a server computer in an exemplary payment processing network according to embodiments of the invention.

With reference to FIG. 4, an exemplary server computer 200 in payment processing network 26 is shown. The exemplary server computer 200 is illustrated as comprising a plurality of hardware and software modules (201-211).

The exemplary server computer 200 comprises a processor 201, system memory 202 (which may comprise any combination of volatile and/or non-volatile memory such as, for example, buffer memory, RAM, DRAM, ROM, flash, or any other suitable memory device), and an external communication interface 203. Moreover, one or more of the modules 204-211 may be disposed within one or more of the components of the system memory 202, or may be disposed externally.

The communication module 204 may be configured or programmed to receive and generate electronic messages. When an electronic message is received by the server computer 200 via external communication interface 203, it may be passed to the communications module 204. The communications module 204 may identify and parse the relevant data based on a particular messaging protocol used in the system 10. The received information may comprise, for instance, identification information, transaction information, and/or any other information that the payment processing network 26 may utilize in authorizing a financial transaction or performing a settlement and clearing procedure. The communication module 204 may then transmit any received information to an appropriate module within the server computer 200 (e.g. via a data bus line 250). The communication module 204 may also receive information from one or more of the modules in server computer 200 and generate an electronic message in an appropriate data format in conformance with a transmission protocol used in the system 10 so that the message may be sent to one or more components within the system 10 to an issuer computer 28 or merchant computer 22). The electronic message may then be passed to the external communication interface 203 for transmission. The electronic message may, for example, comprise an authorization response message (e.g. to be transmitted to a merchant conducting a transaction) or may be an authorization request message to be transmitted or forwarded to an issuer.

The database look-up module 205 may be programmed or configured to perform some or all of the functionality associated with retrieving information from one or more databases. In this regard, the database look-up module 205 may receive requests from one or more of the modules of server 200 (such as communication module 204, authorization module 208, or settlement module 209) for information that may be stored in one or more of the databases. The database look-up module 205 may then determine and a query an appropriate database.

The report generation module 207 may be programmed or configured to perform some or all of the functionality associated with generating a report regarding a user, an account, a transaction or transactions, or any other entity or category of information with regard to system 10. This may include, for instance, identifying patterns (such as patterns that indicate a fraudulent transaction or transactions) and generating one or more alerts that may be sent (e.g. via communication module 204 and external communication interface 203) to one or more entities in the system 10, including the user, merchant, or issuer. The report generation module may also, for example, request information from one or more of the databases via database look-up module 205.

The authorization module 208 may be configured or programmed to perform some or all the functionality associated with authorizing a financial transaction associated with an authorization request message.

The payment processing network 26 may further comprise a decryption module 210, which can receive encrypted additional data, and decrypt the additional data. In some embodiments of the invention, the additional data can be a rating of the transaction. The payment processing network 26 may also include a ratings module 211, to parse, process, and interpret the decrypted ratings. For example, some ratings may be on a scale of 1 to 10, or 1 star to 5 stars. Additionally, the ratings module is not limited to only ratings, but the payment processing network 26 may include other modules for processing other types of additional data that may be encrypted/decrypted.

Figure 5:
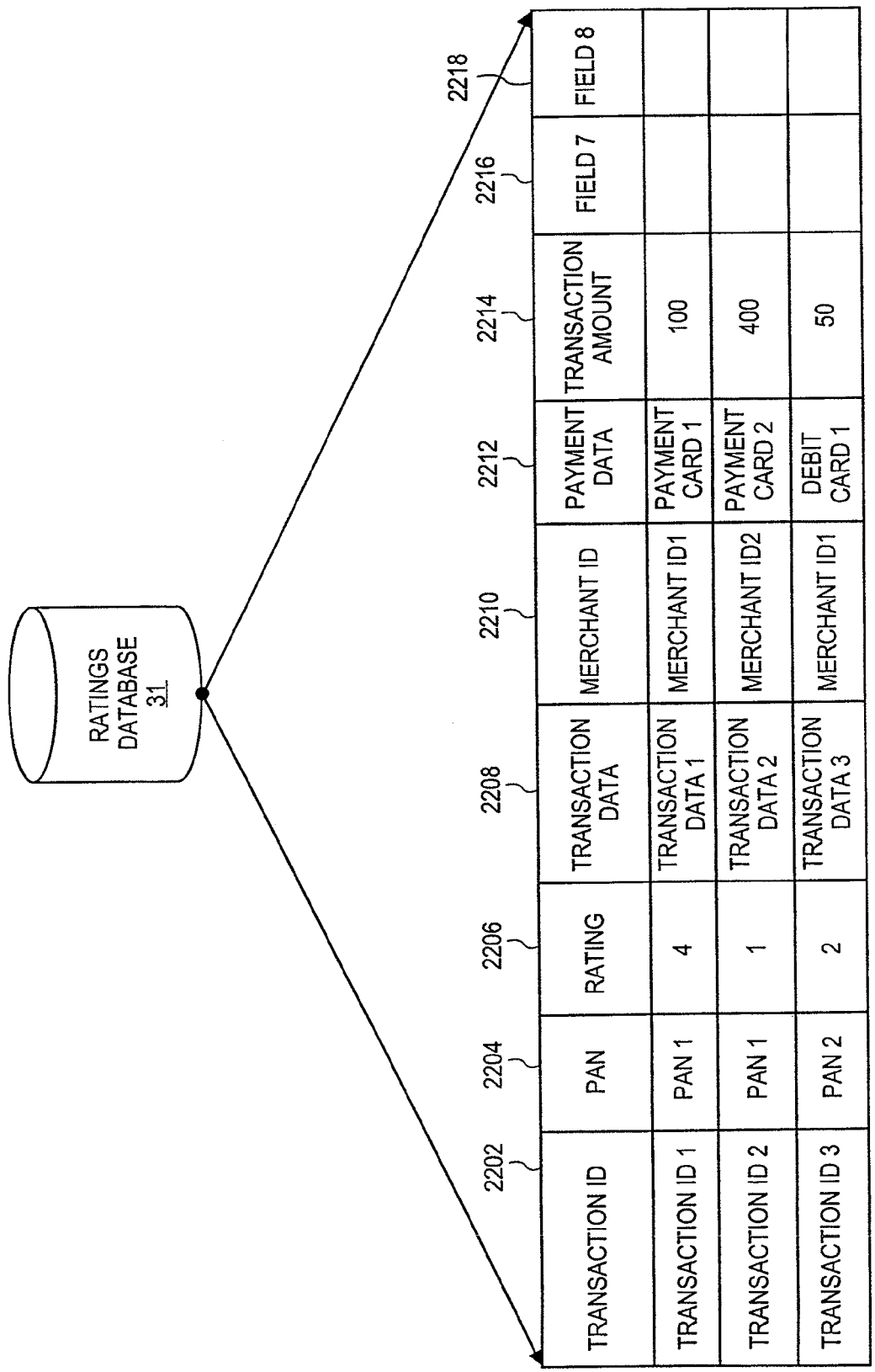
FIG. 5 shows an exemplary database according to embodiments of the invention.

FIG. 5 illustrates an exemplary ratings database 31, or additional data database 42. The ratings database 31 may comprise a look-up table of different fields 2202-2218. Each field may include data relating to the transaction and/or the user, such as transaction ID 2202, account identifier (e.g., PAN) 2204, a rating of the transaction (or other additional data) 2206, merchant ID 2210, payment data (e.g., payment card information) 2212, transaction amount 2214, and/or transaction data (e.g., items purchased, services provided) 2208.

As shown in FIG. 5, additional data such as ratings, authentication data, surveys, etc. may be stored in a database with actual transaction data. By doing this, the additional data is more meaningful and authentic.

Figure 6A:
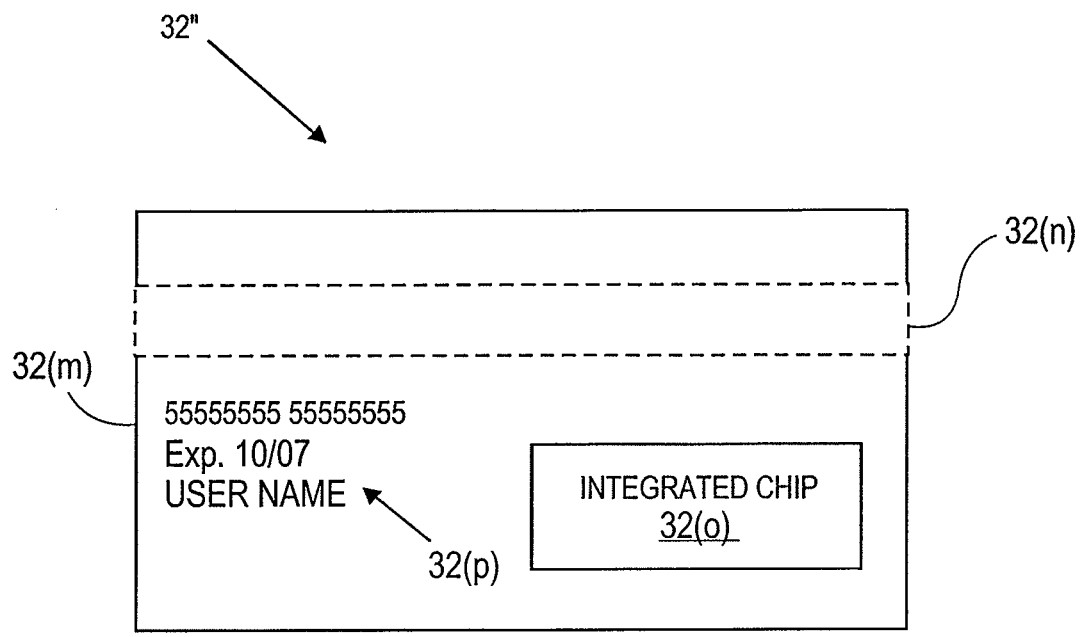
FIG. 6(a) illustrates an exemplary payment card with an integrated chip according to embodiments of the invention.

FIG. 6(a) shows an example of a payment device 32" in the form of a card. As shown, the payment device 32" comprises a plastic substrate 32(m). In some embodiments, an integrated chip 32(o) (e.g., contactless chip) for interfacing with an access device 34 may be present on, or embedded within, the plastic substrate 32(m). Consumer information 32(p) such as an account number, expiration date, and/or a user name may be printed or embossed on the card. A magnetic stripe 32(n) may also be on the plastic substrate 32(m). In some embodiments, the payment device 32" may comprise a microprocessor and/or memory chips with user data stored in them.

As noted above and shown in FIG. 12(a), the payment device 32" may include both a magnetic stripe 32(n) and an integrated chip 32(o). In some embodiments, both the magnetic stripe 32(n) and the integrated chip 32(o) may be in the payment device 32". In some embodiments, either the magnetic stripe 32(n) or the integrated chip 32(o) may be present in the payment device 32".

Figure 6B:
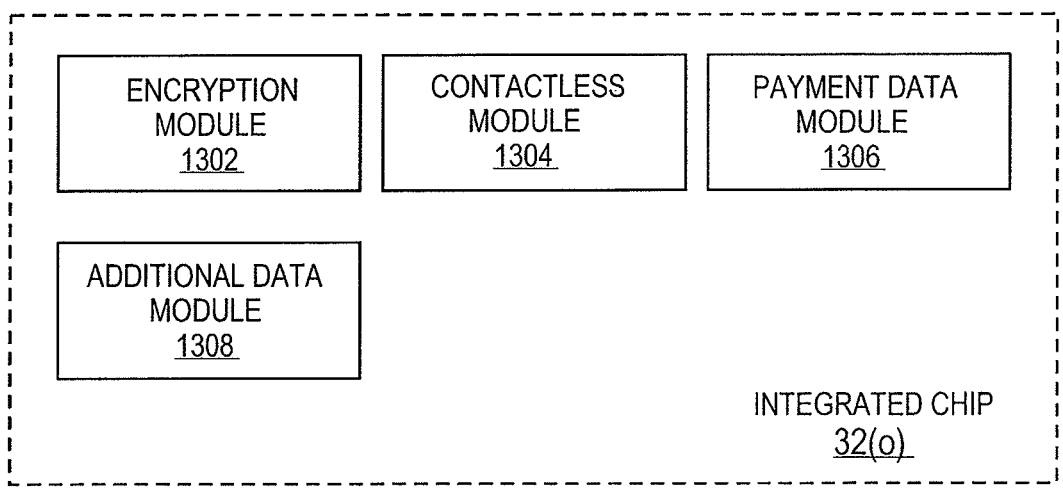
FIG. 6(b) shows a block diagram showing components of an exemplary integrated chip of a payment card according to embodiments of the invention.

As shown in FIG. 6(b), the integrated chip 32(o), according to embodiments of the invention may also include several software modules, including, but not limited to, a payment data module 1306, a ratings module 1308, a contactless module 1304, and an encryption module 1302. The encryption module may have similar functionality as the encryption module 604 in FIG. 11. The contactless module 1304 may enable the payment card 32 to communicate with the access device 34, in a wireless manner, such that holding the payment card in near proximity of the access device enables communication to conduct a transaction. The payment data module 1306 may store and manage payment data (e.g., credit card, debit cards, bank accounts) for payment of the transaction conducted. The additional data module 1308 may receive additional data associated with the transaction. Then the additional data module 1308 may send the additional data collected to the encryption module 1302 to be encrypted before it is transmitted to an access device 34.

Figure 7:
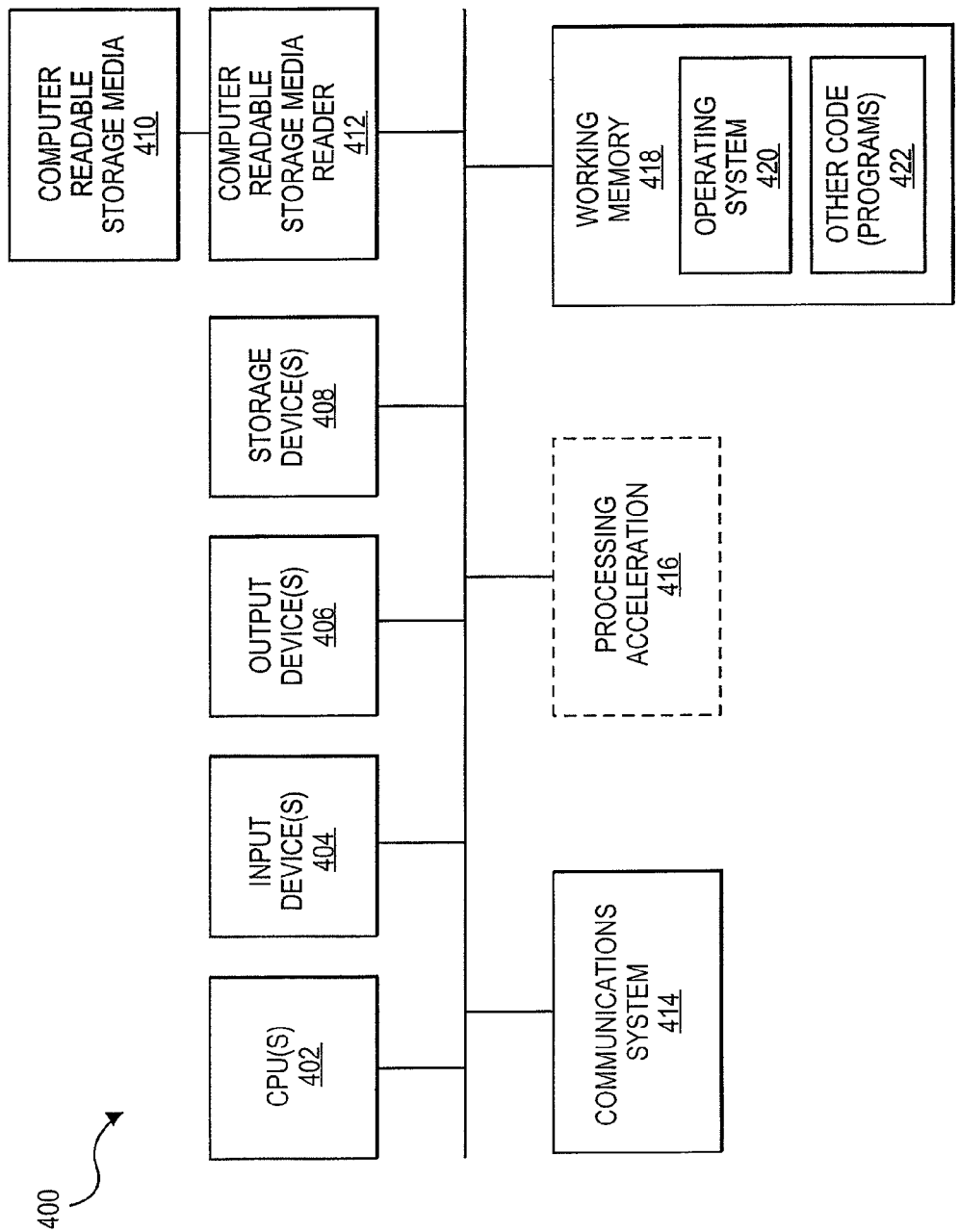
FIG. 7 shows an exemplary computer apparatus that may be used in a system according to an embodiment of the invention.

FIG. 7 shows an exemplary computer apparatus according to embodiments of the invention, in which various embodiments may be implemented. The system 400 may be used to implement any of the computer systems described above (e.g., client computer, a server computer at the payment processing network, a computer apparatus at the merchant, etc.). The computer system 400 is shown comprising hardware elements that may be electrically coupled via a bus 424. The hardware elements may include one or more central processing units (CPUs) 402, one or more input devices 404 (e.g., a mouse, a keyboard, etc.), and one or more output devices 406 (e.g., a display device, a printer, etc.). The computer system 400 may also include one or more storage devices 408. By way of example, the storage device(s) 408 can include devices such as disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 412, a communications system 414 (e.g., a modem, a network card (wireless or wired), an infra-red communication device, etc.), and working memory 418, which may include RAM and ROM devices as described above. In some embodiments, the computer system 400 may also include a processing acceleration unit 416, which can include a digital signal processor DSP, a special-purpose processor, and/or the like.

The computer-readable storage media reader 412 can further be connected to a computer-readable storage medium 410, together (and, optionally, in combination with storage device(s) 408) comprehensively representing remote, local, fixed, and/or removable storage devices plus storage media for temporarily and/or more permanently containing, storing, transmitting, and retrieving computer-readable information. The communications system 414 may permit data to be exchanged with the network and/or any other computer described above with respect to the system 400.

The computer system 400 may also comprise software elements, shown as being currently located within a working memory 418, including an operating system 420 and/or other code 422, such as an application program (which may be a client application, Web browser, mid-tier application, RDBMS, etc.). It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Embodiments of the invention have many advantages. In embodiments of the invention, user feedback or additional data regarding a transaction and/or a merchant is protected from tampering by the merchant by encrypting the feedback at the time of the transaction before being transmitted to the merchant. This is accomplished by having the user enter additional data (e.g., rating) in an access device, and this can be transferred to a card where it is encrypted. The encrypted additional data is then sent to a payment processing network (e.g., VisaNet) through an authorization request message from the merchant or by some other means, as a proprietary additional data of the transaction.

One example of such additional data is a rating of the merchant showing purchase experience (e.g., 0-5 stars). At the time of payment, an access device payment application may display a menu, where the user can enter or select 0 to 5 stars. In other embodiments, the user may use a payment device, such as a smartcard, that when communicating with an access device, can initiate the menu or other prompt for data to display on the access device.

One advantage is that this additional data (e.g., rating) could be of value to the merchant accepting the payment transaction, but to prevent the merchant from tampering with the additional data, the additional data is encrypted, and the payment processing network controls access to the decrypted additional data. Only by subscribing to receive the decrypted additional data, the merchant may be allowed to access the data.

The user benefits from providing additional data, such as rating his or her experience and sharing the rating with other users for future reference of where and with whom to conduct transactions with. There are existing means that allow users to rate and share their ratings with other users (e.g., Yelp, TripAdvisor, Google Latitude, and other similar services). However, user ratings are not fully protected from or for the merchant in currently existing services. Encrypting the additional data (e.g., rating) from the merchant ensures the security and protects the authenticity of user ratings, thus encouraging users to provide feedback and trust that their (and other users') feedback will be accurate and untampered with.

In embodiments of the invention, the merchant can benefit from a rating associated with a single transaction and can be encrypted to ensure that it is not modified in transit, thus assuring the merchant that the rating is provided by a real consumer, rather than one who has signed into a review service and provides fraudulent ratings because that person was never a recent customer or was never a customer at all.

Embodiments of the invention may use existing technology and systems for payment processing, with no or minimal changes. In existing payment processing systems and methods, an authorization request message may contain a supplemental data field (e.g., Field 55), in which an encrypted additional data element (e.g., rating) may be stored. Thus, the merchant POS terminal may transmit the authorization request message to the payment processing network with the encrypted additional data contained in Field 55. The payment processing network may be enabled to (1) understand Field 55 or other supplemental data field, (2) decrypt the encrypted additional data, and (3) store the decrypted additional data and/or send the decrypted additional data back in a generated authorization response message, depending on a subscription status of the merchant. The subscription status of the merchant may be determined by looking up a merchant identifier in a table or database at the payment processing network.

In other embodiments of the invention, the payment processing network may be associated with a publisher of ratings, such as Yelp, Trip Advisor, Google (Latitude), Yahoo, Microsoft, Facebook or other entity. This may be beneficial so that users can go anywhere and see how merchants rate via multiple venues based on the user's preference. Further, the ratings data can be used by such sites to verify that comments are actually associated with real purchase transactions. This can make the reviews more authentic and reliable.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
  receiving, by a server computer, from an access device associated with a merchant during a transaction, an authorization request message comprising an account number and encrypted additional data related to the transaction involving the merchant;
  requesting, by the server computer, authorization for the transaction by sending a request message to an issuer computer, wherein the request message comprises the account number included in the received authorization request message;
  decrypting, by the server computer, the encrypted additional data included in the authorization request message associated with the transaction;
  storing, by the server computer, the decrypted additional data associated with the transaction in a database;
  receiving, by the server computer, from the issuer computer, an authorization response message that indicates an authorization of the transaction;
  determining, by the server computer, that the merchant is eligible to receive the decrypted additional data associated with the transaction;
  based on determining that the merchant is eligible to receive the decrypted additional data associated with the transaction, modifying, by the server computer, the authorization response message by inserting the decrypted additional data into the authorization response message; and
  transmitting, by the server computer, the modified authorization response message inserted with the decrypted additional data to the access device.

2. The method of claim 1, further comprising:
  removing, by the server computer, the encrypted additional data from the authorization request message;
  generating, by the server computer, the request message based on information in the authorization request message, wherein the request message is different from the authorization request message, and wherein the request message is sent to the issuer computer based upon generating the request message.

3. The method of claim 1, wherein the encrypted additional data indicates a rating associated with the transaction.

4. The method of claim 1, wherein the encrypted additional data indicates a geographical location where the transaction is conducted.

5. The method of claim 1, further comprising:
  prior to the server computer receiving the authorization request message from the access device:
  providing, by the access device, to a payment card, unencrypted additional data;
  encrypting, by the payment card, the unencrypted additional data to form the encrypted additional data that is included in the received authorization request message;
  receiving, by the access device, from the payment card, the encrypted additional data;
  generating, by the access device, the authorization request message comprising the account number and the encrypted additional data; and
  sending, by the access device, the authorization request message to the server computer.

6. The method of claim 5, further comprising:
  displaying, by the access device, a prompt for additional data; and
  receiving, by the access device, the unencrypted additional data based on interaction by a user with the prompt, wherein the unencrypted additional data that is received by the access device is provided to the payment card.

7. The method of claim 6, further comprising:
  before the access device displays the prompt, receiving, by the access device, the prompt from the payment card.

8. The method of claim 1, wherein the authorization request message is sent as the request message to request authorization for the transaction.

9. The method of claim 1, wherein the encrypted additional data indicates a shopping profile of a user involved in the transaction.

10. A server computer comprising:
  a processor; and
  a non-transitory computer readable medium, wherein the non-transitory computer readable medium comprises executable code that, when executed by the processor, causes the processor to perform steps of:
  receiving, by the server computer, from an access device associated with a merchant during a transaction, an authorization request message comprising an account number and encrypted additional data related to the transaction involving the merchant;
  requesting, by the server computer, authorization for the transaction by sending a request message to an issuer computer, wherein the request message comprises the account number included in the received authorization request message;
  decrypting, by the server computer, the encrypted additional data included in the authorization request message associated with the transaction;
  storing, by the server computer, the decrypted additional data associated with the transaction in a database;
  receiving, by the server computer, from the issuer computer, an authorization response message that indicates an authorization of the transaction;
  determining, by the server computer, that the merchant is eligible to receive the decrypted additional data associated with the transaction;
  based on determining that the merchant is eligible to receive the decrypted additional data associated with the transaction, modifying, by the server computer, the authorization response message by inserting the decrypted additional data into the authorization response message; and
  transmitting, by the server computer, the modified authorization response message inserted with the decrypted additional data to the access device.

11. The server computer of claim 10, wherein the steps further comprise:
  removing, by the server computer, the encrypted additional data from the authorization request message;
  generating, by the server computer, the request message based on information in the authorization request message, wherein the request message is different from the authorization request message, and wherein the request message is sent to the issuer computer based upon generating the request message.

12. The server computer of claim 10, wherein the encrypted additional data indicates a rating associated with the transaction.

13. The server computer of claim 10, wherein the encrypted additional data indicates a geographical location where the transaction is conducted.

14. The server computer of claim 10, wherein the authorization request message is sent as the request message to request authorization for the transaction.

15. A system comprising:
  a processor; and
  a memory coupled to the processor, wherein the memory stores executable instructions that, when executed by the processor, cause the processor to perform steps of:
  receiving, by the system, from a mobile communication device associated with a merchant during a transaction, an authorization request message comprising an account number and encrypted additional data related to the transaction involving the merchant;
  requesting, by the system, authorization for the transaction by sending a request message to an issuer computer, wherein the request message comprises the account number included in the received authorization request message;
  decrypting, by the system, the encrypted additional data included in the authorization request message associated with the transaction;
  storing, by the system, the decrypted additional data associated with the transaction in a database;
  receiving, by the system, from the issuer computer, an authorization response message that indicates an authorization of the transaction;
  determining, by the system, that the merchant is eligible to receive the decrypted additional data associated with the transaction;
  based on determining that the merchant is eligible to receive the decrypted additional data associated with the transaction, modifying, by the system, the authorization response message by inserting the decrypted additional data into the authorization response message; and
  transmitting, by the system, the modified authorization response message inserted with the decrypted additional data to the mobile communication device.

16. The system of claim 15, wherein receiving the authorization request message from the mobile communication device is performed using a long range communication protocol.

17. The system of claim 15, further comprising:
  an access device that receives unencrypted additional data using a prompt before the authorization request message is received, wherein the prompt is associated with the transaction conducted using the access device.

18. The system of claim 17, wherein the access device displays the prompt in response to interaction between the mobile communication device and the access device.

19. The system of claim 15, wherein the authorization request message is sent as the request message to request authorization for the transaction.

20. The system of claim 15, wherein the encrypted additional data indicates a shopping profile of a user involved in the transaction.

* * * * *